United States Patent
Skillin

(10) Patent No.: US 9,395,225 B2
(45) Date of Patent: Jul. 19, 2016

(54) ONE-PIECE SELF-LEVELING MEASURED DOSE DISPENSING CLOSURE

(71) Applicant: MWV Slatersville, LLC, Slatersville, RI (US)

(72) Inventor: Clifford W. Skillin, Blackstone, MA (US)

(73) Assignee: WESTROCK SLATERSVILLE, LLC, Norcross, GA (US)

(*) Notice: Subject to any disclaimer, the term of this patent is extended or adjusted under 35 U.S.C. 154(b) by 34 days.

(21) Appl. No.: 14/460,516

(22) Filed: Aug. 15, 2014

(65) Prior Publication Data
US 2015/0048122 A1 Feb. 19, 2015

Related U.S. Application Data
(60) Provisional application No. 61/867,038, filed on Aug. 17, 2013.

(51) Int. Cl.
*G01F 11/26* (2006.01)
*B65D 47/08* (2006.01)

(52) U.S. Cl.
CPC .......... *G01F 11/262* (2013.01); *B65D 47/0847* (2013.01)

(58) Field of Classification Search
USPC .................................................. 222/454–457
See application file for complete search history.

(56) References Cited

U.S. PATENT DOCUMENTS

| | | | |
|---|---|---|---|
| 2,091,929 A | 8/1937 | Kappenberg | |
| 2,739,741 A | 3/1956 | Barnett | |
| 3,288,335 A | 11/1966 | Steffens et al. | |
| 4,015,758 A | 4/1977 | Cavazza | |
| 4,151,934 A * | 5/1979 | Saeki | B65D 47/06 222/437 |
| 4,763,817 A | 8/1988 | Lee | |
| 5,029,736 A | 7/1991 | Maruyama et al. | |
| 5,480,071 A | 1/1996 | Santagiuliana | |
| 5,487,494 A | 1/1996 | Robbins, III | |
| 5,495,964 A | 3/1996 | Santagiuliana | |
| 5,667,094 A | 9/1997 | Rapchak et al. | |
| 6,076,708 A | 6/2000 | Ceccarelli et al. | |
| 6,422,426 B1 | 7/2002 | Robbins, III et al. | |
| 2002/0084292 A1 * | 7/2002 | Chen | A47G 19/34 222/456 |

(Continued)

FOREIGN PATENT DOCUMENTS

| | | |
|---|---|---|
| EP | 0343638 A1 | 11/1989 |
| EP | 0539647 A1 | 5/1993 |
| FR | 2590555 A1 | 5/1987 |
| GB | 497199 | 5/1937 |
| GB | 628091 | 8/1949 |
| GB | 1590175 | 5/1981 |
| GB | 2145061 A | 3/1985 |

(Continued)

*Primary Examiner* — Donnell Long
(74) *Attorney, Agent, or Firm* — Barlow, Josephs & Holmes, LTD.

(57) ABSTRACT

A single dose dispensing closure has a main body with an upper skirt portion for measuring and dispensing a predetermined dose of a flowable product from a container. A bottom wall, a rearwardly angled wall extending upwardly from the bottom wall, and an interior surface of the upper skirt together define a measuring reservoir. A port allows a product to flow from a container into the main body. A lid is movable to a closed position in which the lid portion and the main body define a filling chamber. A hinged closure tab seals an exit orifice on the front of the lid portion. When the exit orifice is closed, a user inverts the dispensing closure and container to substantially fill the filling chamber. When the dispensing closure is righted, a predetermined dose of the flowable product is retained in the reservoir, ready to be dispensed through the exit orifice.

12 Claims, 16 Drawing Sheets

(56) References Cited

U.S. PATENT DOCUMENTS

| | | |
|---|---|---|
| 2005/0087567 A1 | 4/2005 | Nielsen et al. |
| 2009/0159620 A1 | 6/2009 | Nielsen |
| 2011/0163132 A1* | 7/2011 | Moreau ................ B65D 47/263 222/454 |
| 2011/0266311 A1 | 11/2011 | Nielsen |
| 2011/0284590 A1 | 11/2011 | Brannon et al. |

FOREIGN PATENT DOCUMENTS

| | | |
|---|---|---|
| WO | 9108979 | 6/1991 |
| WO | 9713123 A1 | 4/1997 |
| WO | 2006030471 A2 | 3/2006 |
| WO | 2006072972 A2 | 7/2006 |
| WO | 2011137901 A2 | 11/2011 |

* cited by examiner

ONE-PIECE SELF-LEVELING MEASURED DOSE DISPENSING CLOSURE

CROSS-REFERENCE TO RELATED APPLICATIONS

This application is a non-provisional application of, and claims the benefit to, U.S. Application No. 61/867,038, filed 17 Aug. 2013, the entire contents of which are incorporated herein by reference.

BACKGROUND OF THE INVENTION (1) Field of the Invention

The instant invention relates to dispensing closures for containers for flowable products such as personal care products, concentrated beverages, food products, and healthcare products, and more particularly to a dispensing closure that can measure a dose of product by inverting the product container to fill a main chamber and then uprighting the container to automatically measure the dose, and finally dispense the dose by tilting the container and pouring from an exit orifice.

(2) Description of Related Art

Dispensing containers are used in a variety of industries for dispensing of various liquid products. For example, dispensing containers may be used for shampoo, lotion, condiments, or beverages. As integrated dispensing closures become more prevalent in all industries, consumers push for their use on an ever expanding array of products and packages, and product manufacturers push for unique solutions and reduced costs to promote sales and maintain profit margins.

SUMMARY OF THE INVENTION

The instant invention describes a single dose dispensing closure for dispensing a predetermined dose of a flowable product from a product container when the user inverts the dispensing closure so product flows into the dispensing closure, then turns the dispensing closure upright so that the product drains back into the container retaining only a predetermined dose of the product in a measuring reservoir, then opens an exit orifice, and finally tips the dispensing closure again to dispense the product.

A unique aspect of the invention is that the closure is molded as a single piece. This requires that a top wall or lid portion of the closure be molded in an open position and then rotated closed prior to use.

The dispensing closure has a main body that is securable to a container by way of a lower skirt portion extending downwardly from the main body. The lower skirt portion has an inner surface that is configured and arranged to be secured to a product container. In the exemplary embodiment, the inner surface of the lower skirt portion is threaded to engage an outwardly threaded neck of a container.

The dispensing closure also has a lid portion, which is sealed to the main body before use. More specifically, the lid portion is connected to an upper peripheral edge of an upper skirt portion of the main body by a living hinge, and the lid portion is movable from an open position to a closed position. The lid portion has an upper lid wall, an annular sealing wall depending from the upper lid, and an outer skirt depending from the upper lid wall. The annular inner sealing wall and the outer lid skirt are configured to frictionally seal the lid portion to the main body portion when the lid is in the closed position. When the lid portion is in the closed position, the main body portion and the lid portion cooperate to define a filling chamber into which product can flow from the container.

To allow a flowable product to pass from a container into the filling chamber, the main body has a middle deck having a port located adjacent to the rear of the main body. When the dispensing closure is secured to a container, a user can fill the filling chamber by inverting the dispensing closure wherein product flows from the container through the port and into the filling chamber.

Once a product has been received in the filling chamber, the product is retained in a measuring reservoir integrally formed within the main body by returning the dispensing closure to an upright position. When upright, excess product drains back into the container leaving a predetermined dose retained in the measuring reservoir. The measuring reservoir is defined within the main body's upper skirt portion, which extends upwardly from the middle deck of the main body. The middle deck has a bottom wall and an angled interior wall extending upwardly and rearwardly from the middle deck. The angled wall has side portions which are integrally connected with an interior surface of the upper skirt portion. The bottom wall of the middle deck, the angled wall, and the upper skirt portion cooperate to define the interior measuring reservoir for measuring a predetermined dose of the flowable product.

In the exemplary embodiment, the bottom wall protrudes downwardly into the neck of the container. However, in alternate embodiments, the bottom wall of the deck can be made to be flush with the top of the container neck so that a safety seal can be placed over the container neck opening.

For dispensing the product from the dispensing closure, an exit orifice is defined on the lid portion. The exit orifice is positioned so that it is at the front of the main body portion when the lid portion is in the closed position. To allow a consumer to selectively open and close the exit orifice, a hinged closure tab is attached to the upper lid wall.

When a user wishes to dispense a predetermined dose of the product from the container, the user first ensures that the exit orifice is closed. The user then inverts the product container and the attached dispensing closure. When the closure is inverted, the flowable product flows out of the container and enters the filling chamber through the entrance port. In this step, the flowable product substantially fills the filling chamber.

Next, the user returns the container and dispensing closure to an upright position, and only the predetermined dose is retained in the measuring reservoir. The excess product that had been in the filling chamber drains back into the container through the entrance port.

Finally, the consumer opens the exit orifice by pivoting the closure tab away from the exit orifice, and pours the product out of the closure through the exit orifice by tipping the container forward. As product flows out of the measuring reservoir through the exit orifice at the front of the container, the rearwardly angled interior wall of the measuring reservoir substantially impedes product inflow from the container through the port. Thus, in a properly controlled pour, only the predetermined dose is dispensed.

Accordingly, it can be seen that the exemplary embodiments provide a one-piece self-leveling measured dose dispensing closure. The dispensing closure is easy to use. Also, the dispensing closure cleanly dispenses a product from a container without the need for additional measuring equipment. The dispensing closure can be formed as a single piece. The dispensing closure has a standard skirt finish. When the dispensing closure is formed of a transparent material, the user can see the premeasured dose before dispensing. In some embodiments, the bottom wall does not extend below the lower end of the lower skirt so that the manufacturer can place a seal or other liner on the neck of a container, and the dispensing closure can be secured to the neck without damaging the seal or liner during product distribution and before purchase.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of the various and exemplary embodiments of the invention when read in conjunction with the accompanying drawings wherein:

DETAILED DESCRIPTION OF THE INVENTION

Figure 1:
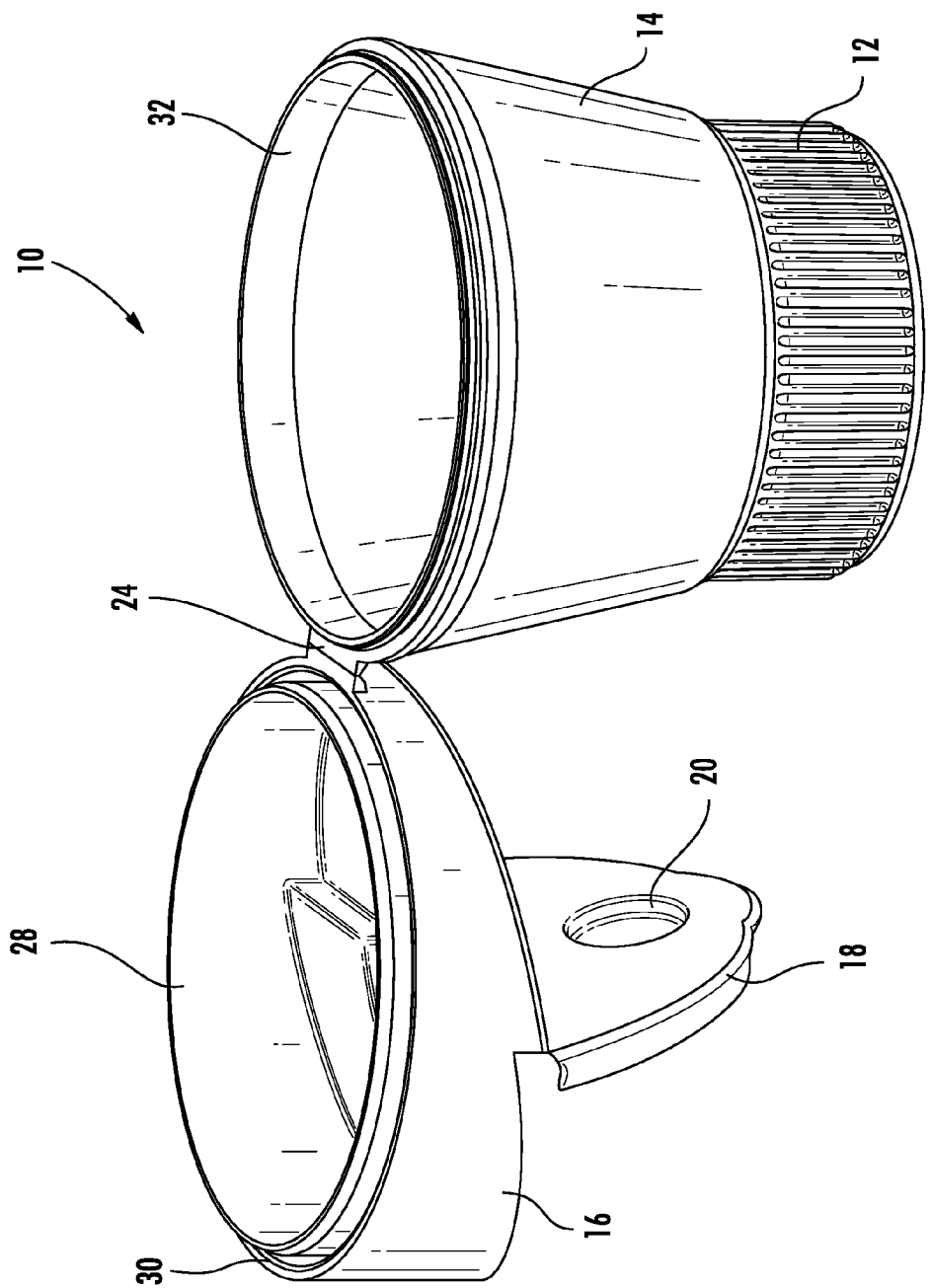
FIG. 1. Is a perspective view of an exemplary embodiment of the dispensing closure of the present invention in an open position.

Referring now to the drawings, the one-piece self-measuring leveled dose dispensing closure of the instant invention is illustrated and generally indicated at 10 in FIGS. 1-14. As will hereinafter be more fully described, the instant invention relates to dispensing closures for containers for flowable products such as personal care products, concentrated beverages, food products, and healthcare products, and more particularly to a dispensing closure that can measure a dose of product by inverting the product container to fill a main chamber and then uprighting the container to automatically measure the dose, and finally dispense the dose by tilting the container and pouring from an exit orifice.

Figure 2:
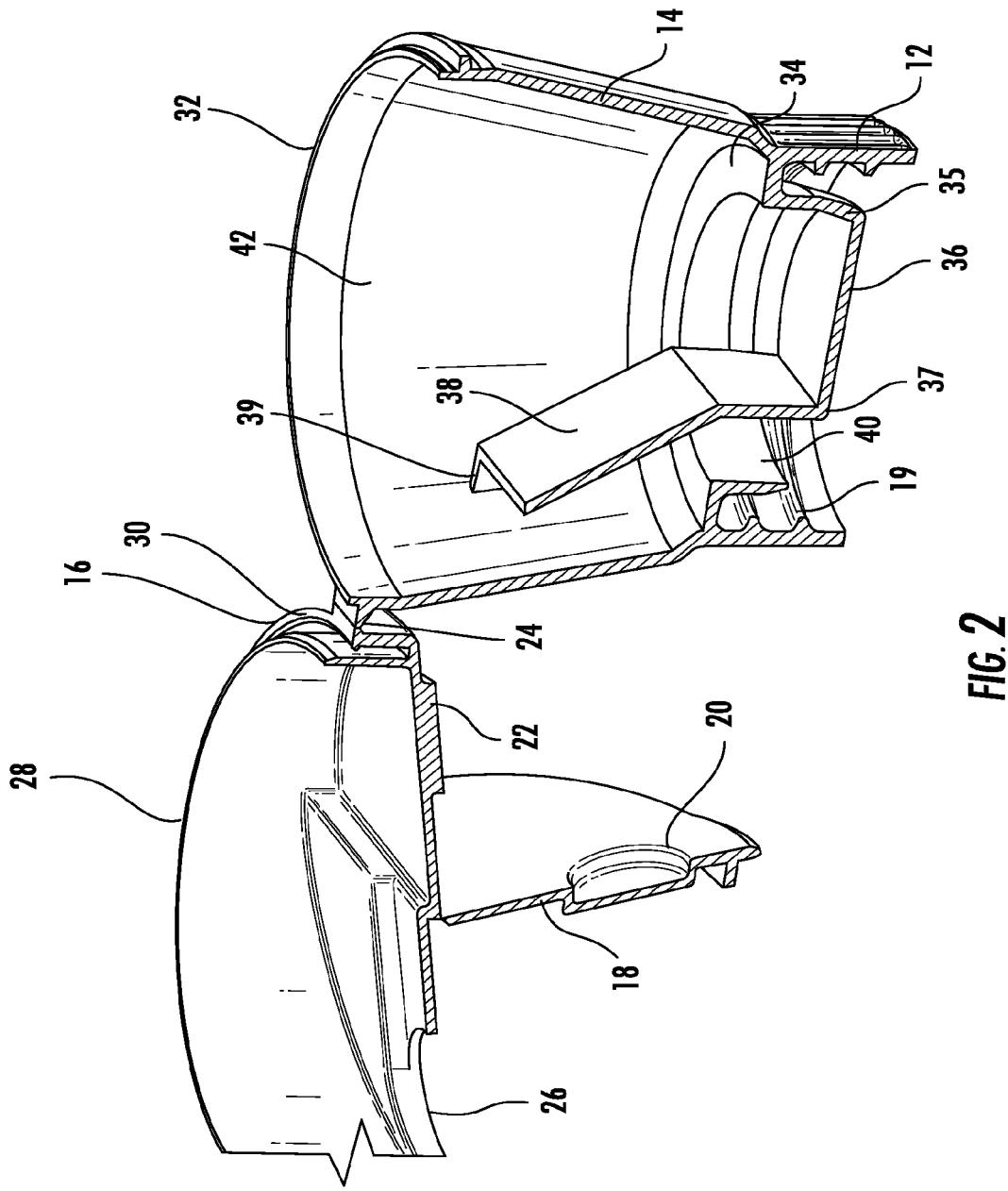
FIG. 2 is a sectional view thereof, showing the reservoir chamber.
Figure 3:
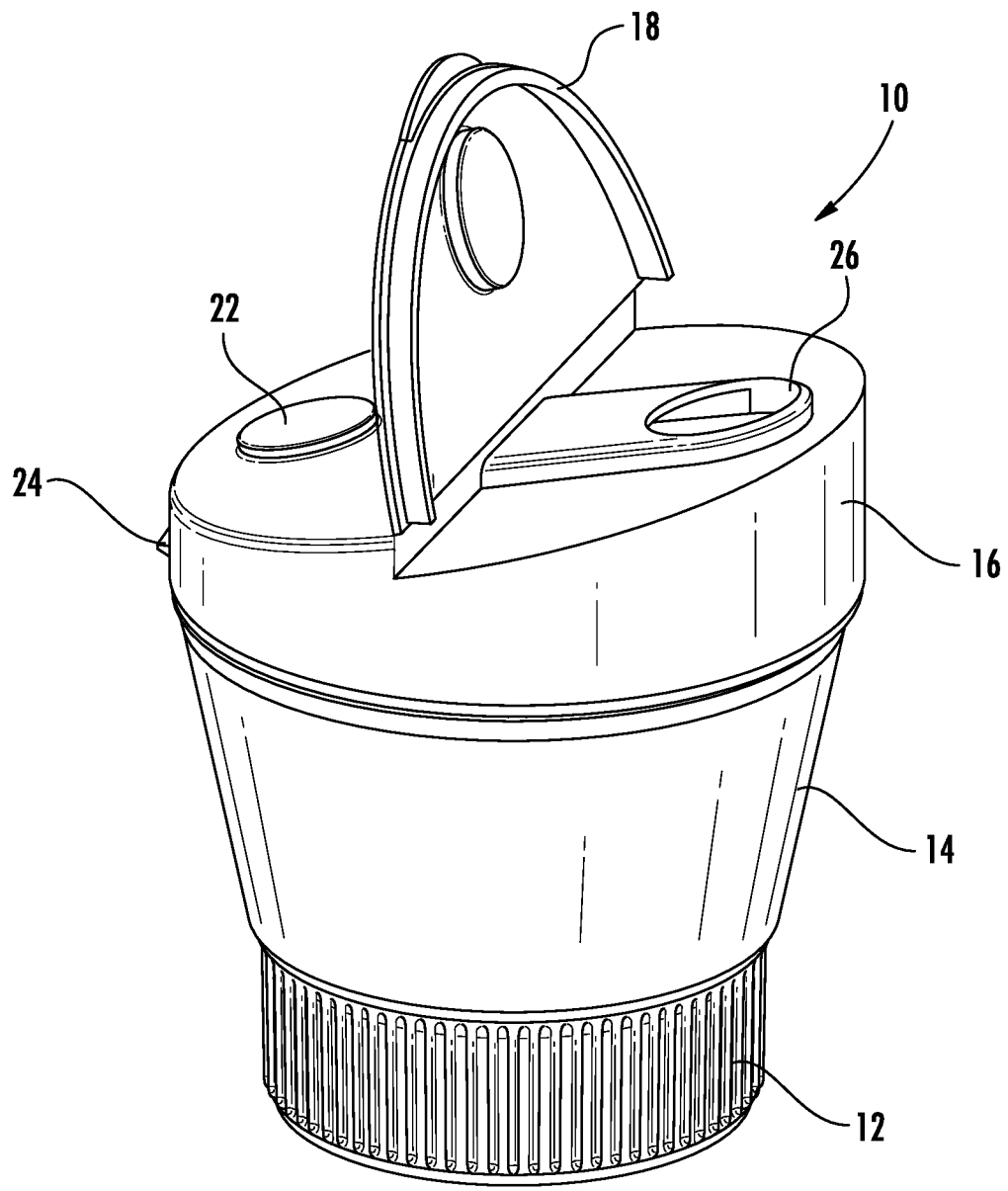
FIG. 3 is a perspective view of the dispensing closure in a closed position.
Figure 4A:
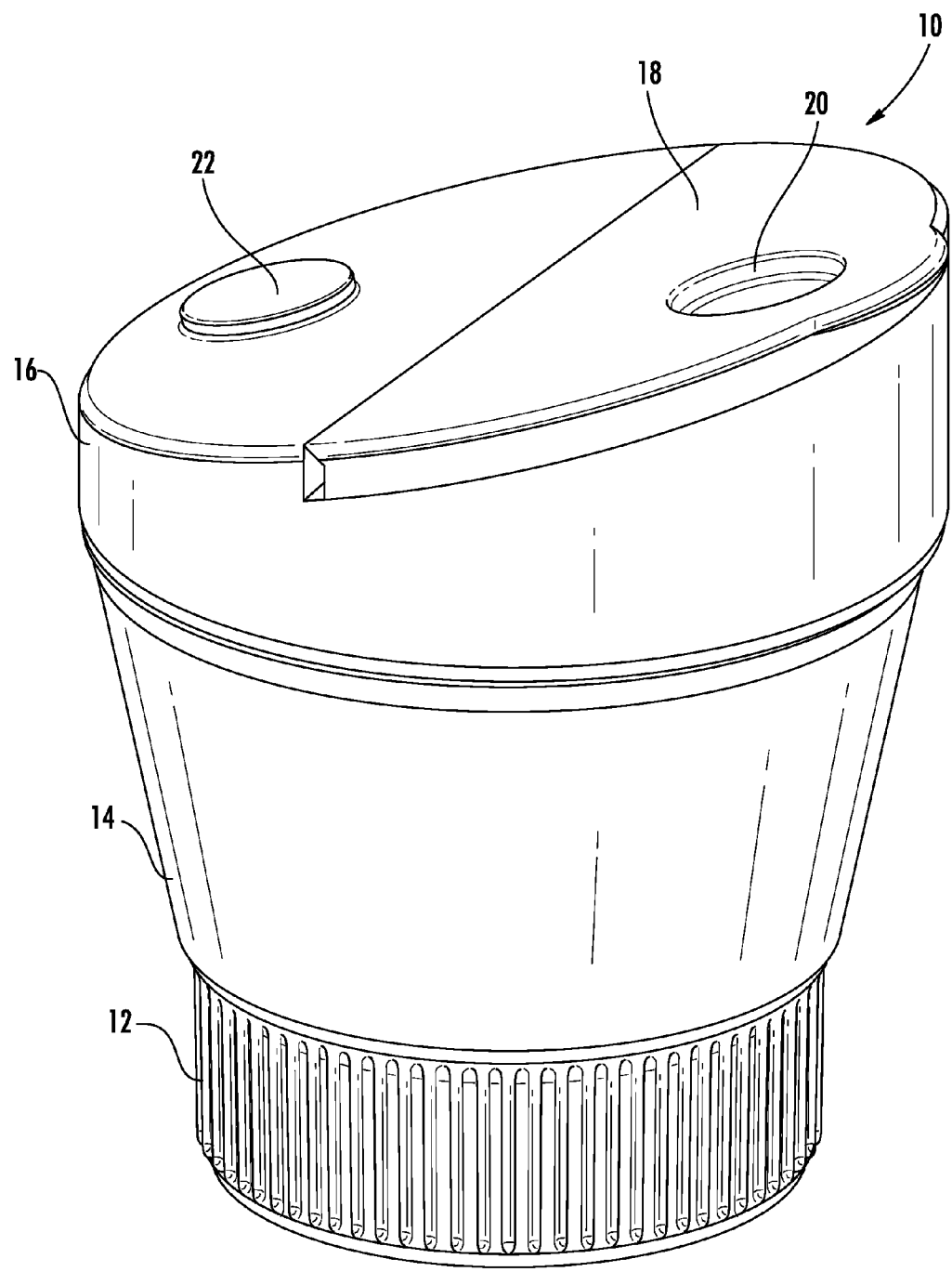
FIG. 4a is another view thereof with the closure tab sealing the exit orifice.
Figure 4B:
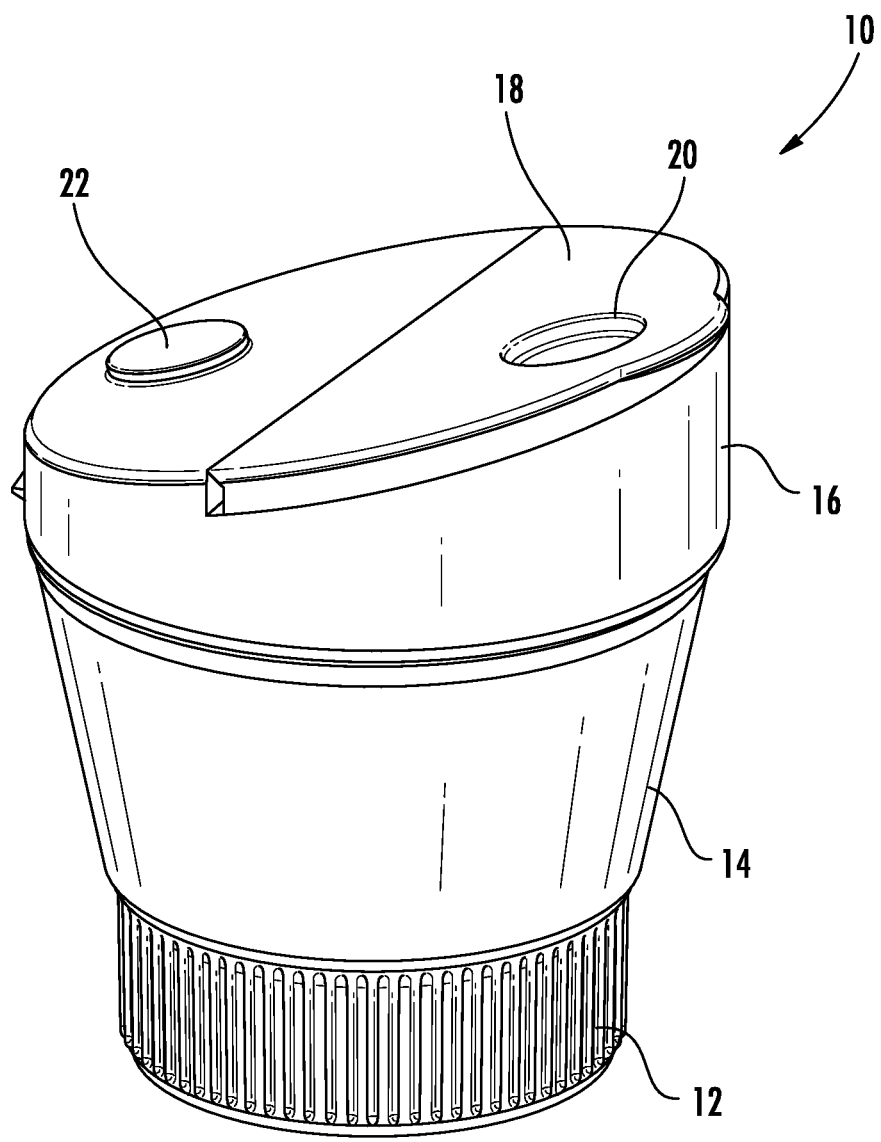
FIG. 4b is another view thereof.

The dispensing closure 10 may be formed by injection molding or another method. It may be formed from plastic, or other materials. FIG. 1 shows an exemplary embodiment of the one-piece self-leveling measured dose dispensing closure 10 of the present invention. FIG. 2 shows a perspective sectional view of the dispensing closure 10.

The dispensing closure 10 has a main body having a lower skirt portion 12 and an upper skirt portion 14. The lower skirt portion 12 has an inner surface that is configured and arranged to engage a product container. The lower skirt portion 12 provides a sealed attachment of the main body to the product container around an opening on a container so that any product that passes through the container opening is directed into the main body of the dispensing closure, as described below, rather than leaking out between the product container and the lower skirt 12 of the main body. In the exemplary embodiment shown in FIG. 2, threads 19 are formed on the inner surface of the lower skirt 12 so the lower skirt 12 may be secured to an outwardly threaded neck on a product container 50 (see FIG. 6), providing a sealed connection of the lower skirt to the product container. Other methods of securing the lower skirt 12 to a container are possible without departing from the scope of the present invention. The dispensing closure can be configured to fit stock bottle necks.

The lower skirt portion 12 is configured to direct a flowable product from the container into the upper skirt portion 14 of the main body. The upper skirt portion 14 and the lower skirt portion 12 are separated by a middle deck. In FIG. 2, the middle deck has a horizontally extending deck wall 34, an annular side wall 35 depending downwardly from the horizontally extending deck wall 34, and a bottom wall 36. The middle deck also has a port 40 for passage of the flowable product from the container into the upper skirt of the main body portion. The port 40 is located adjacent to the rear of the main body portion, and is adjacent to a rear edge 37 of the bottom wall 36. The port 40 is configured to allow a product to flow freely from the container and into the upper skirt portion 14.

To direct the flow of a product through the port 40, an angled interior wall 38 extends upwardly from the bottom wall 36 of the middle deck. The angled interior wall 38 has side portions 39 which are integrally connected with the interior surface 42 of the upper skirt portion 14. Thus, when a product flows from the container, through the lower skirt portion 12, and into the upper skirt portion 14, it is directed through the port 40 and a path partially enclosed by the angled interior wall 38, the side walls 39, and the interior surface 42 of the upper skirt 14.

Additionally, the bottom wall 36 of the middle deck, the angled wall 38, the side walls 39, and the interior surface 42 of the upper skirt portion cooperate to define an interior measuring reservoir generally indicated at 13 (see FIG. 5) for measuring a predetermined dose of a flowable product. The operation of this measuring reservoir is discussed in more detail below.

In order to prevent fluid from exiting the upper skirt portion 14 unintentionally, the dispensing closure 10 also includes an integrally formed lid portion 16 that is connected to the upper peripheral edge 32 of the upper skirt portion 14 of the main body by a living hinge 24. The lid portion 16 is manufactured in an open position, as shown in FIGS. 1 and 2. The lid portion 16 is then moved to a closed position, in which it is frictionally and substantially permanently sealed to the upper skirt portion 14 of the main body, to produce the configuration of the dispensing closure shown in FIGS. 3, 4a, and 4b. By "substantially permanently" the Applicant means that the lid portion is difficult to unseat from the main body and is not intended to be reopened once moved to the closed position. These figures show the dispensing closure 10 in a fully assembled configuration, detached from a container, which is not part of the present invention. The dispensing closure 10 may be secured to a container and then delivered to a consumer, but the container and dispensing closure may be delivered in an unassembled state.

Figure 5:
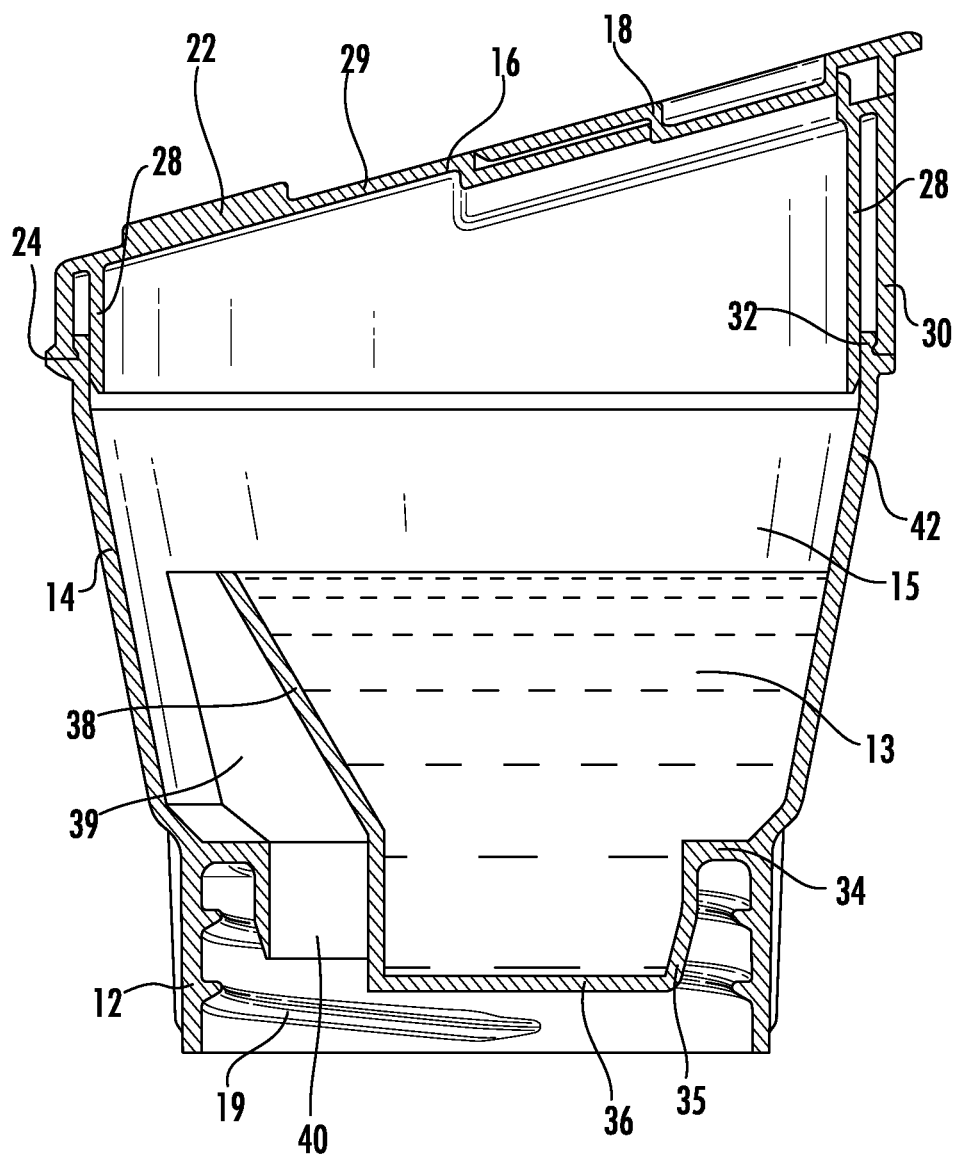
FIG. 5 is a cross sectional view of the dispensing closure.

To form a frictional seal of the lid portion 16 to the main body portion when the lid portion 16 is in the closed position, the lid portion 16 has an annular sealing wall 28 depending from an upper lid wall 29, and an outer skirt 30 depending from the upper lid wall 39, as shown in FIG. 5. In the exemplary embodiment shown in FIG. 5, the annular sealing wall 28 and the outer skirt 30 engage opposite faces of the upper peripheral wall 32 of the upper skirt portion 14. To improve the frictional seal, the outer skirt 30 and the outer face of the upper peripheral wall 32 each have a lip formed thereon to restrict rotation of the lid portion 16 about the living hinge 24 once the lid portion has been moved to the closed position. The frictional engagement of the annular sealing wall 28 and the interior surface 42 of the upper skirt portion provide a seal that prevents a product from passing between them. Thus, when the lid portion 16 is in the closed position, it seals the upper end of the upper skirt portion 14 of the main body, preventing a product from being dispensed from between the lid portion 16 and the upper skirt portion 14.

In the closed position, the lid portion 16 and the upper skirt portion 14 define a filling chamber generally indicated at 15 (see FIG. 5). When the dispensing closure 10 shown in FIG. 5 is inverted, a product is directed from a container through the port 40 and into the filing chamber defined by the upper skirt portion 14 and the lid portion 16. The product will substantially fill the filling chamber. However, depending on the geometry of the filling chamber, some air might remain in the filling chamber.

The filling chamber 15 is configured to have a greater volume than the measuring reservoir 13 so that the product is caused to self-level as it fills measuring reservoir is completely filled when the container is inverted and turned upright again. When the user inverts the dispensing closure 10 and turns it upright again, the flowable product partially drains back into the product container through the entrance port 40, leaving the predetermined dose of the flowable product within the reservoir. The height of the angled interior wall 38 and side walls 39 determine the final height level of the predetermined measured dose within the upper skirt portion 14, as a flowable product above that height would spill over the walls 38, 39 and return to the container through the port 40. Together the height of the angled interior wall 38 and side walls 39, the depth of the bottom wall 36, and other dimensions defining the reservoir in the upper skirt portion 14 determine the volume of the predetermined measured dose that will be dispensed.

The user may then dispense the predetermined dose of the flowable product from the reservoir 13 of the upper skirt portion 14 through an exit orifice 26 defined on the upper lid portion 16 when the exit orifice is opened and the product container is tipped forward or inverted again. A hinged closure tab 18 is attached to the upper lid wall 29 for opening and closing the exit orifice 26.

The hinged closure tab 18 has a latch-back mechanism that allows a user to secure the hinged closure tab in an open position. The latch-back mechanism of the exemplary embodiment includes a latch protrusion 22 on the upper surface of the lid portion and a latch recess 20 on the upper surface of the hinged closure tab 18. When a user frictionally engages the latched protrusion 22 with the latch recess 20, the hinged tab 18 is frictionally secured to the lid portion 16 so that the exit orifice 26 remains open until the user disengages the latch-back mechanism and seals the exit orifice 26 with the hinged closure tab 18.

Figure 6:
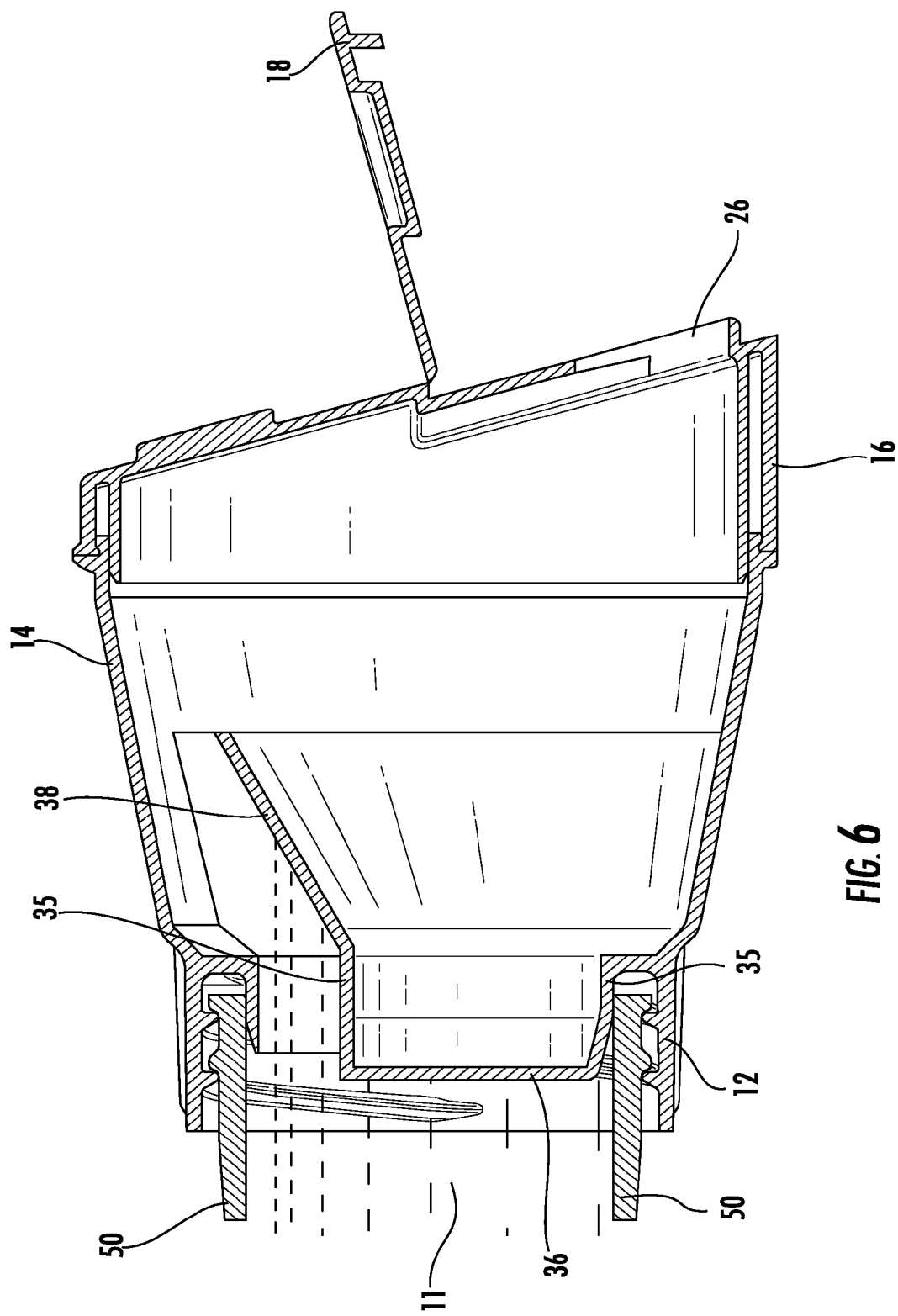
FIG. 6 is a cross sectional view thereof showing the rearwardly angled interior wall preventing fluid from flowing into the reservoir chamber when the dispensing closure is secured to a product container and tipped forward.

The exit orifice 26 is configured to cleanly dispense the product from the dispensing closure 10. It is positioned so that it is at the front of the main body portion when the lid portion 16 is in the closed position. In the exemplary embodiment, the exit orifice 26 is formed on the upper lid wall 29, as shown in FIG. 6. It is possible to position the exit orifice in alternative places towards the front of the dispensing closure 10, as long as it is positioned at the opposite side of the dispensing closure 10 from the upper end of the angled interior wall 38, as explained below.

Because the exit orifice is located at the front of the dispensing closure 10, tipping the dispensing closure forward when the exit orifice is open causes product to be dispensed from the reservoir through the exit orifice 26. At the same time, the rearwardly angled interior wall 38 is angled away from the exit orifice 26 so that it inhibits flow of a product through the port 40 into the filing chamber and out of the exit orifice. FIG. 6 shows how the angled interior wall can prevent a fluid product 11 from passing directly from the neck of a container 50 (partially shown for purposes of illustration) through the port and out of the exit orifice when the dispensing closure 10 and container are tipped 90° forward.

Figure 7:
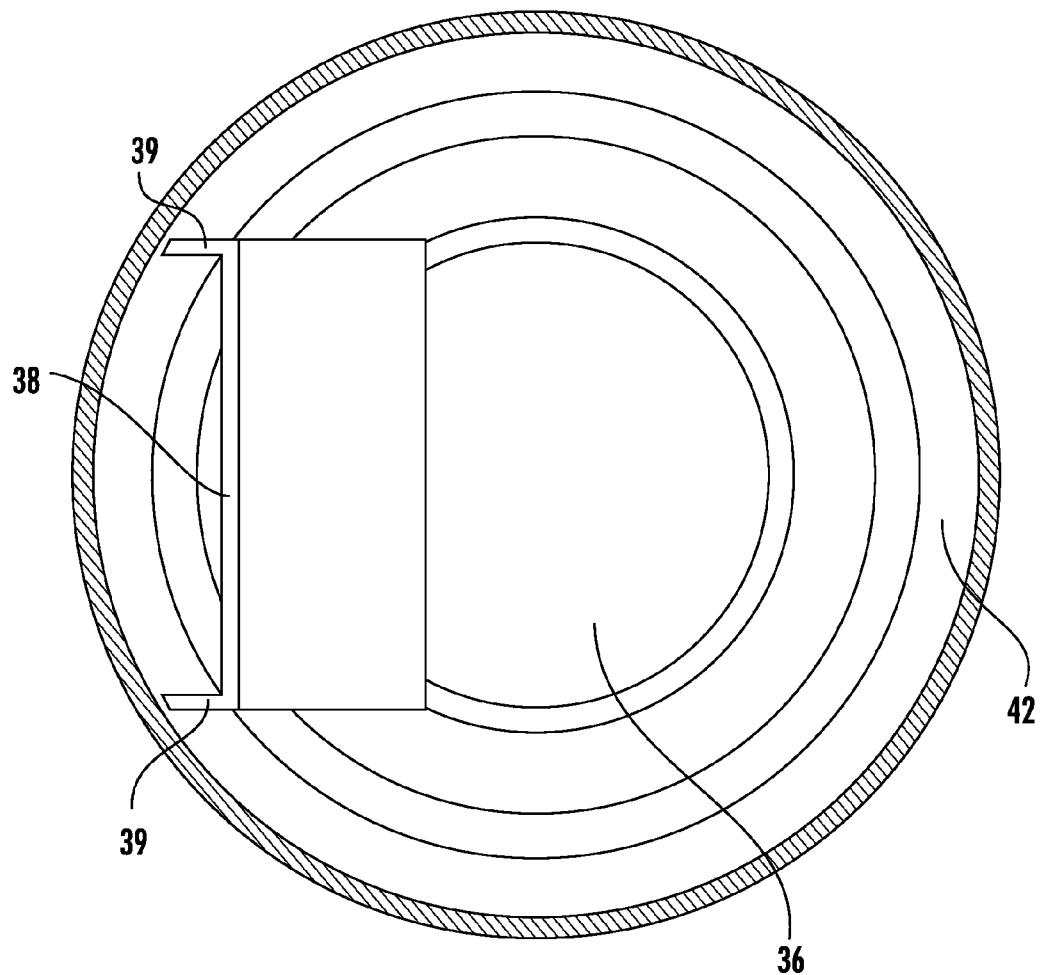
FIG. 7 is a top sectional view of the main body.

To further illustrate this, FIG. 7 provides a sectional top view through the upper skirt portion 14 of the main body. FIG. 7 shows how the angled interior wall 38 extends sufficiently towards the rear of the dispensing closure 10 that it extends over the port 40 when viewed from above.

Figure 8A:
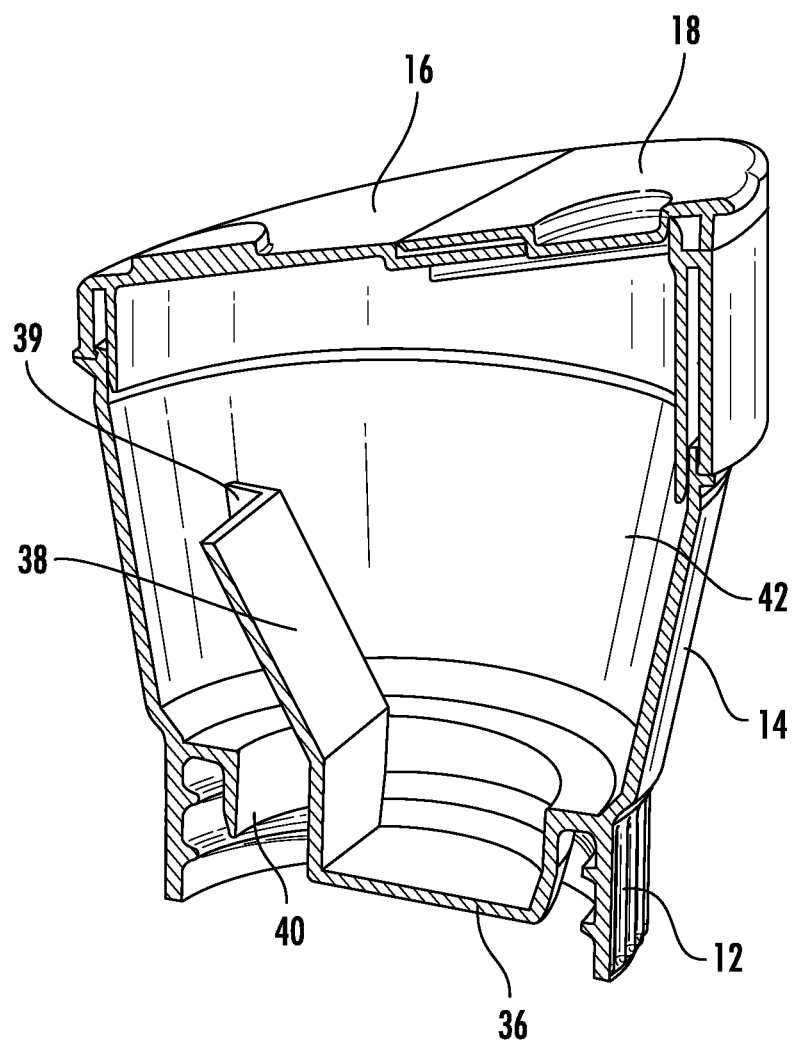
FIG. 8a is a perspective view of the dispensing closure cut to show the reservoir chamber, and with the closure tab sealing the exit orifice.
Figure 8B:
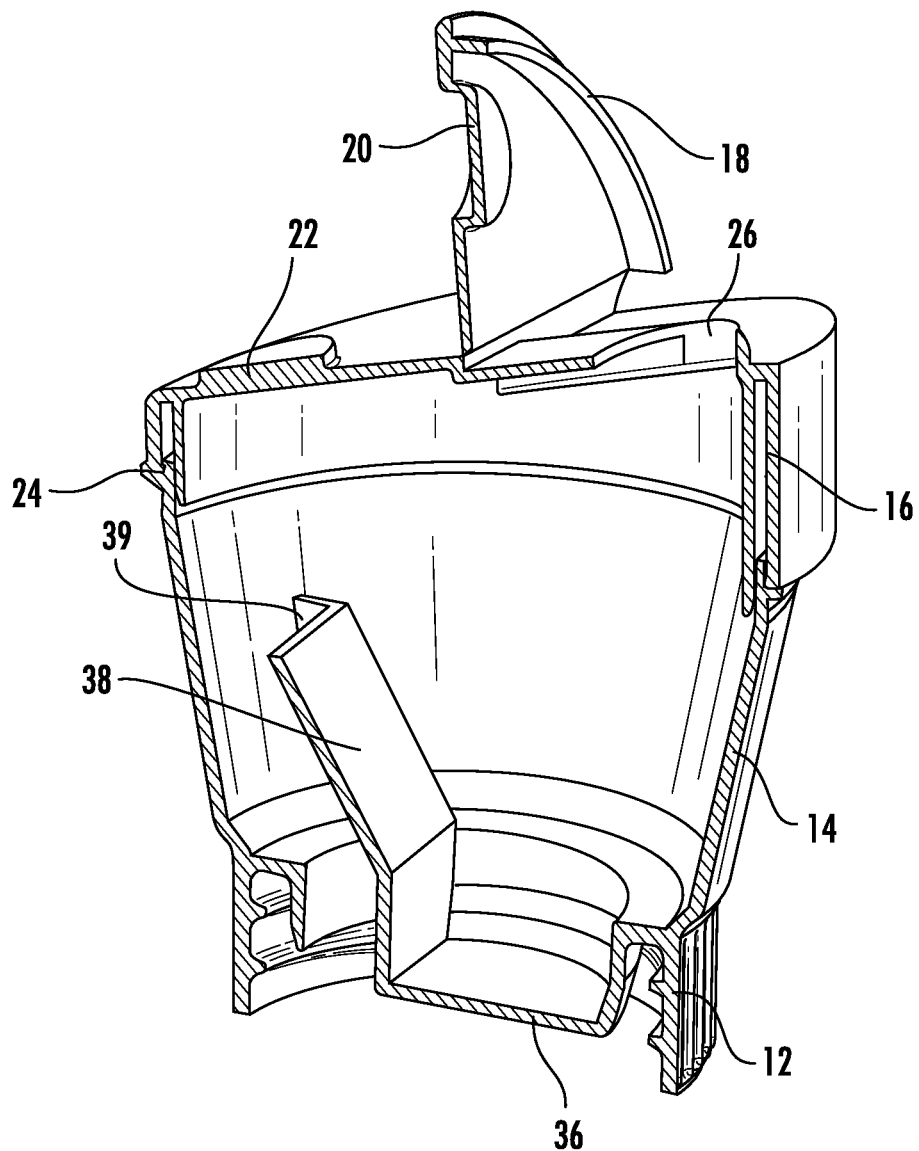
FIG. 8b is another view thereof with the closure tab in an open position.
Figure 9:
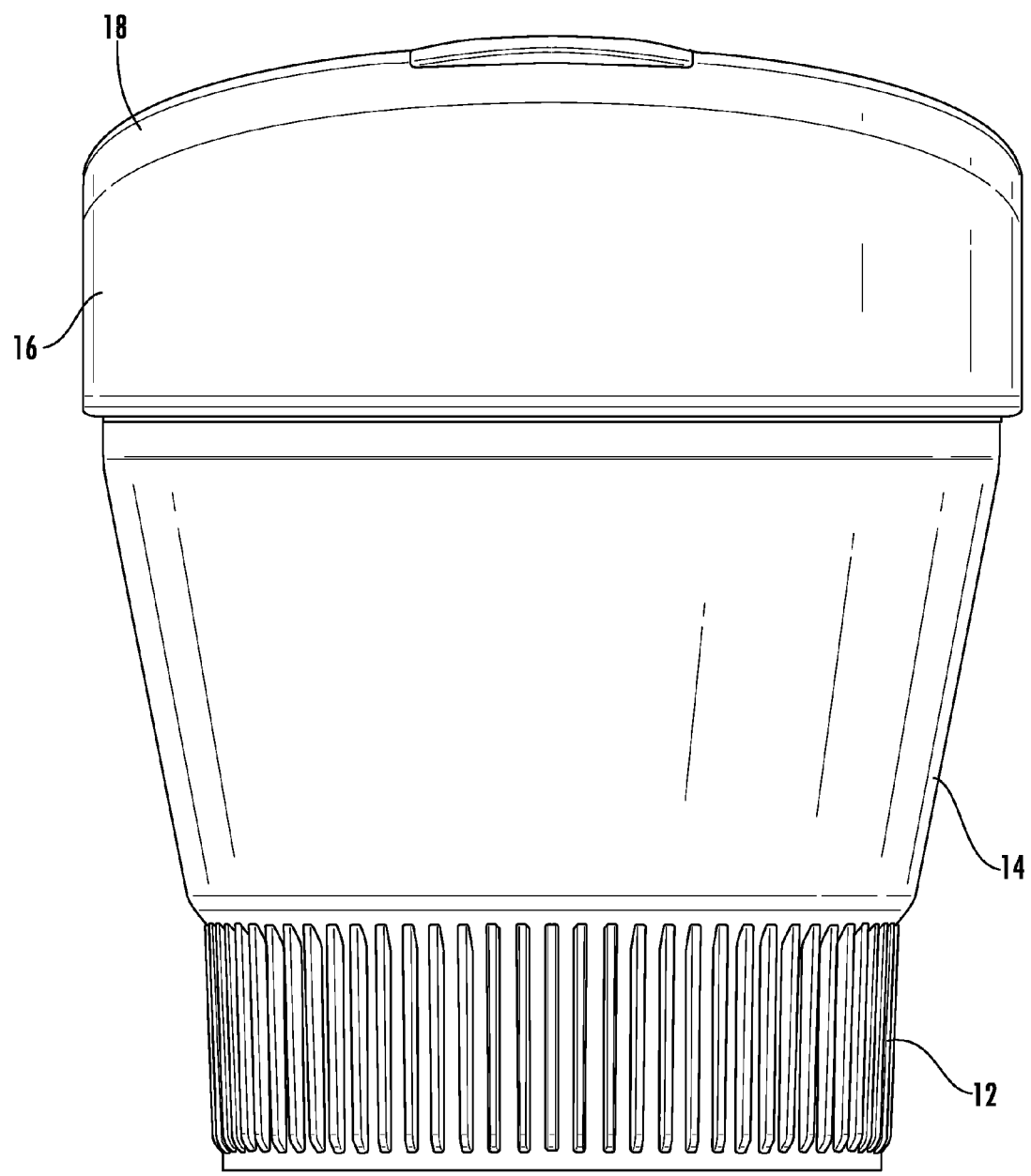
FIG. 9 is a front view of the dispensing closure.
Figure 10:
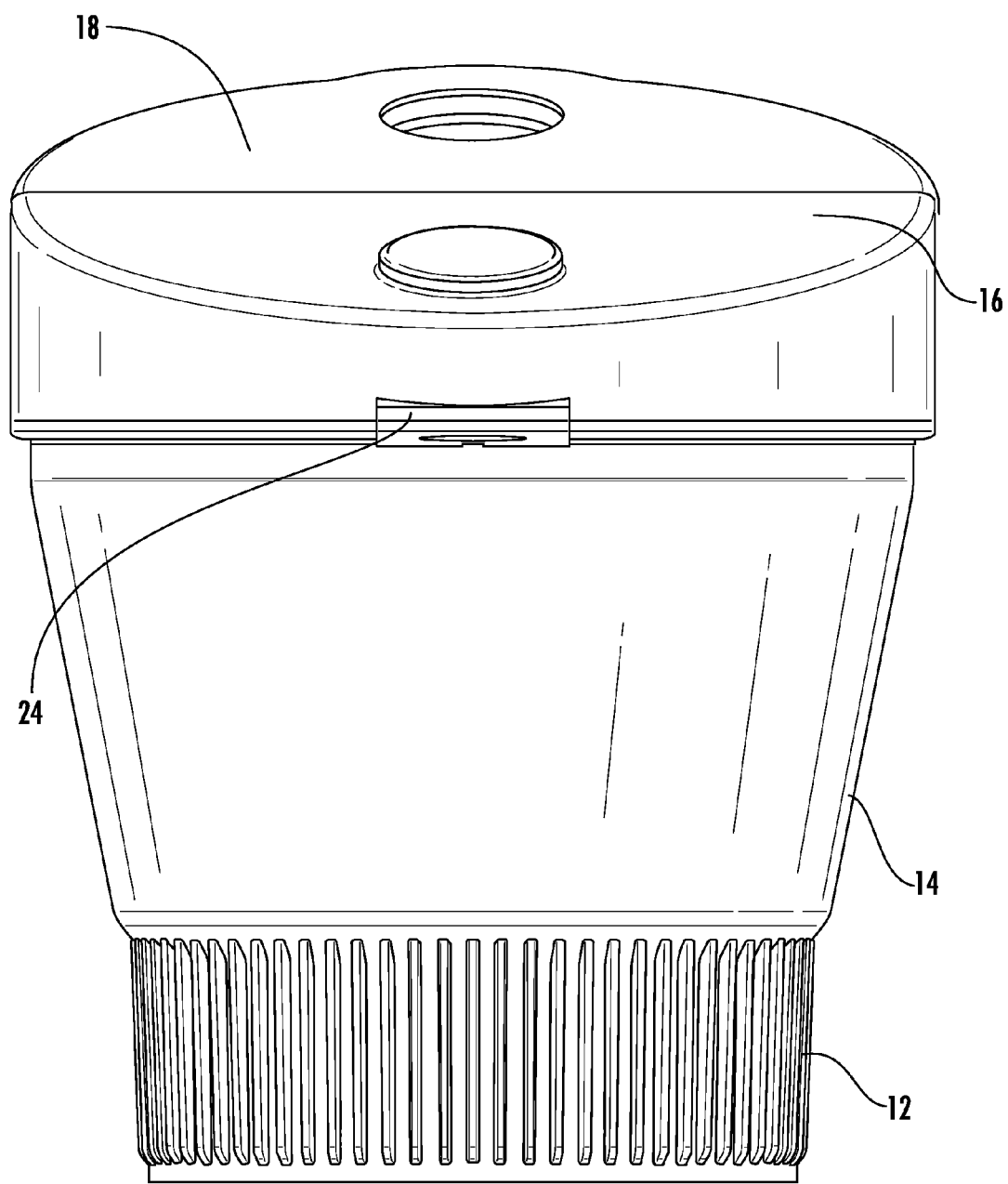
FIG. 10 is a rear view thereof.
Figure 11:
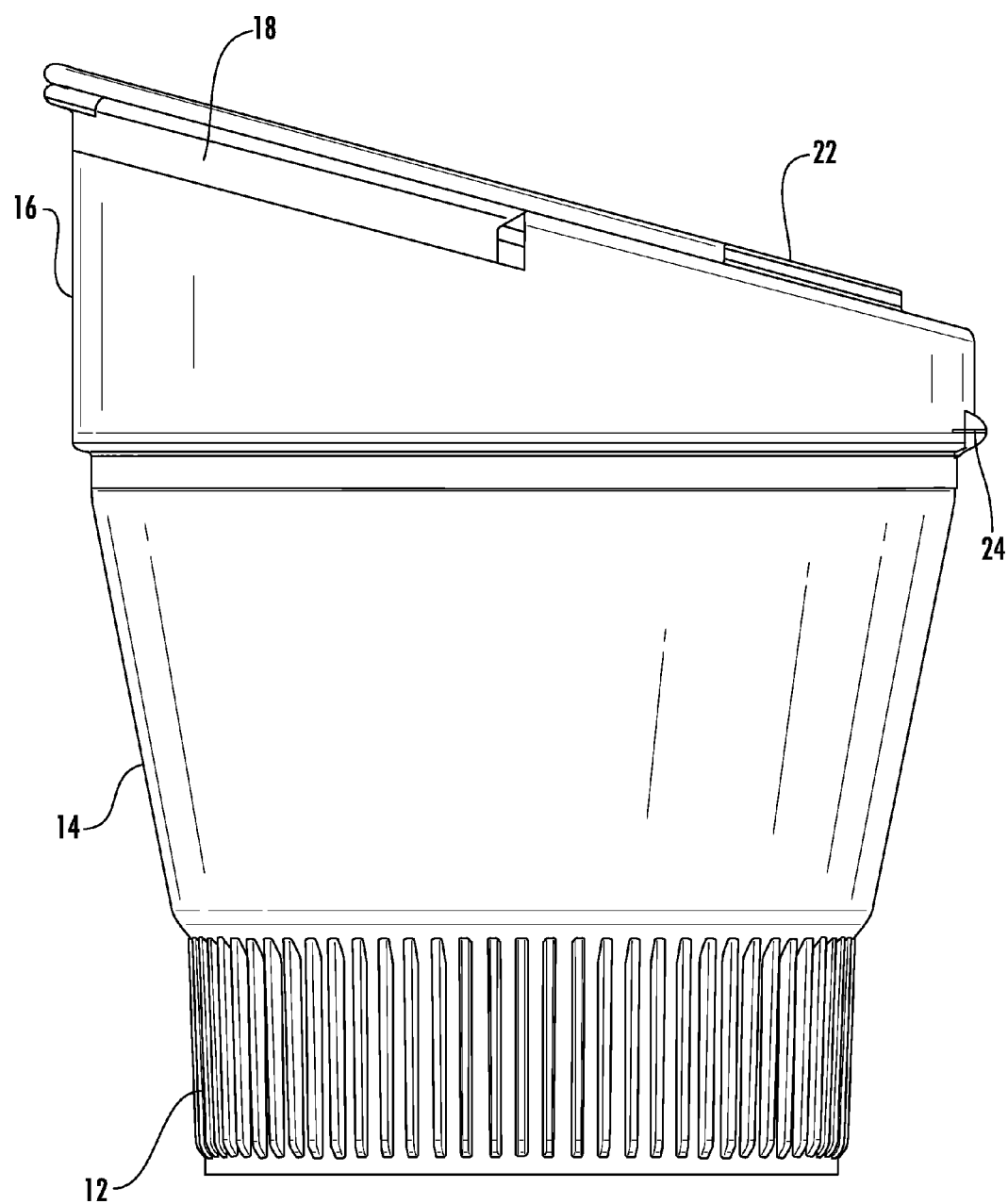
FIG. 11 is a right view thereof.
Figure 12:
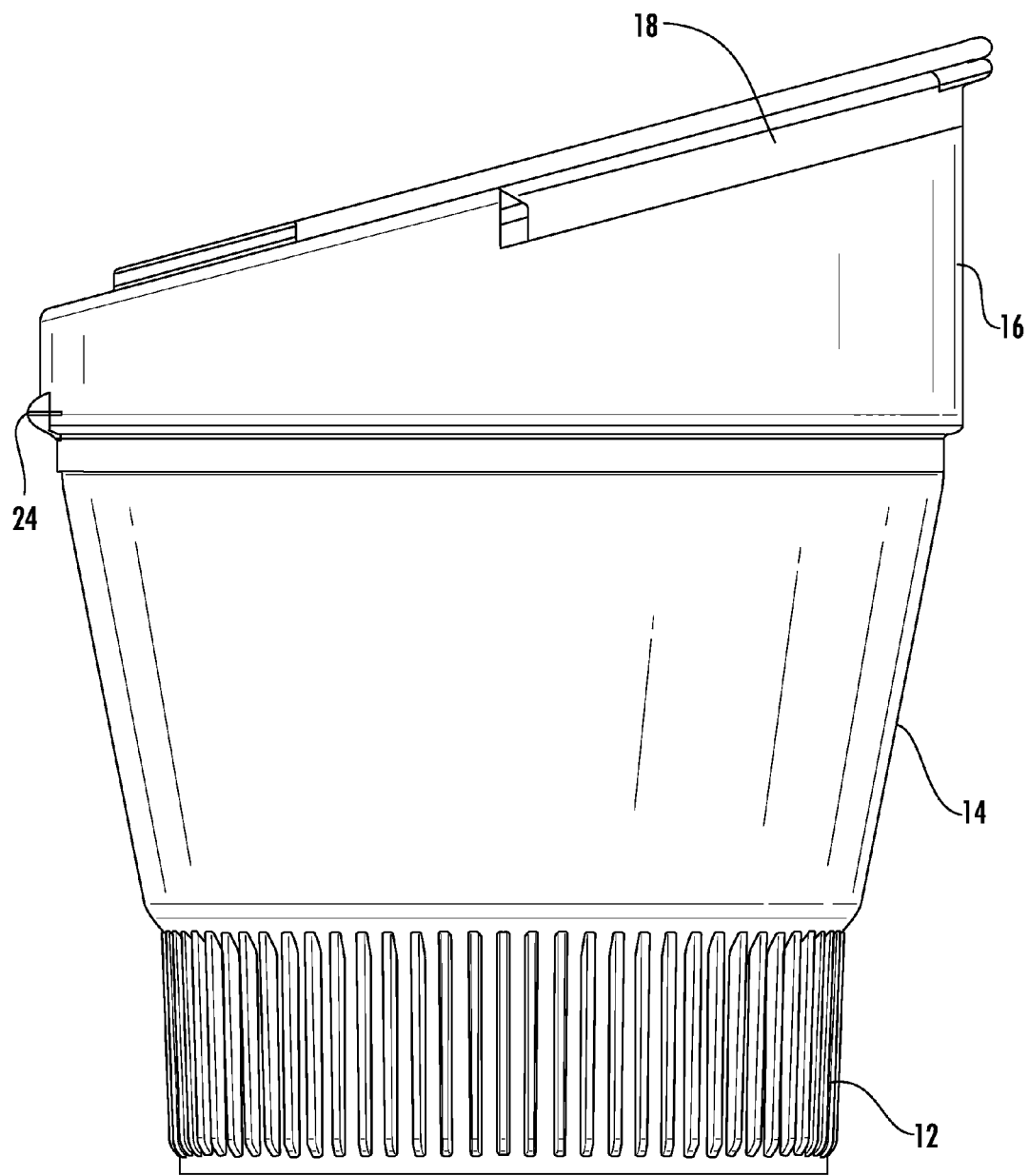
FIG. 12 is a left view thereof.
Figure 13:
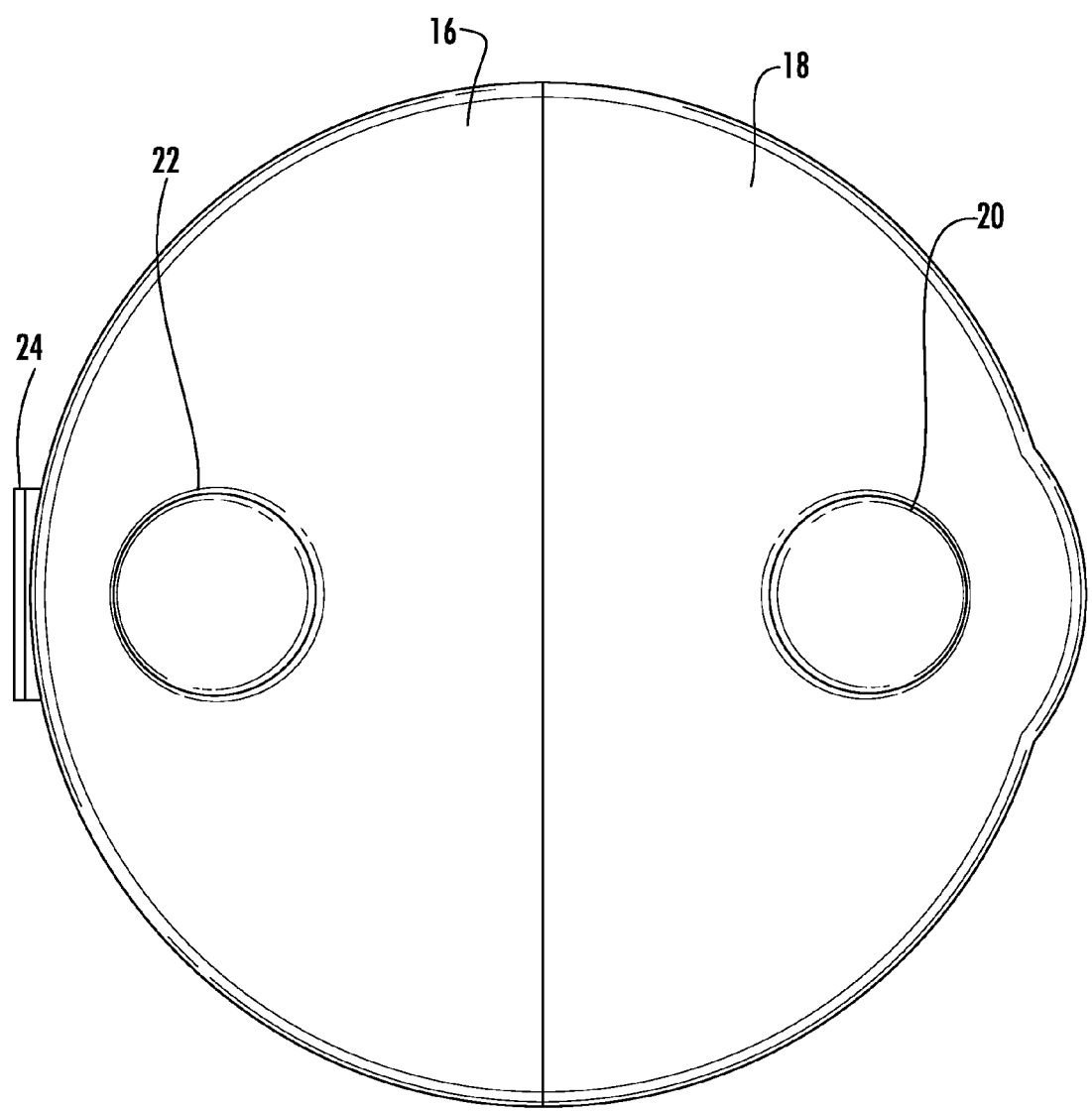
FIG. 13 is a top view thereof.
Figure 14:
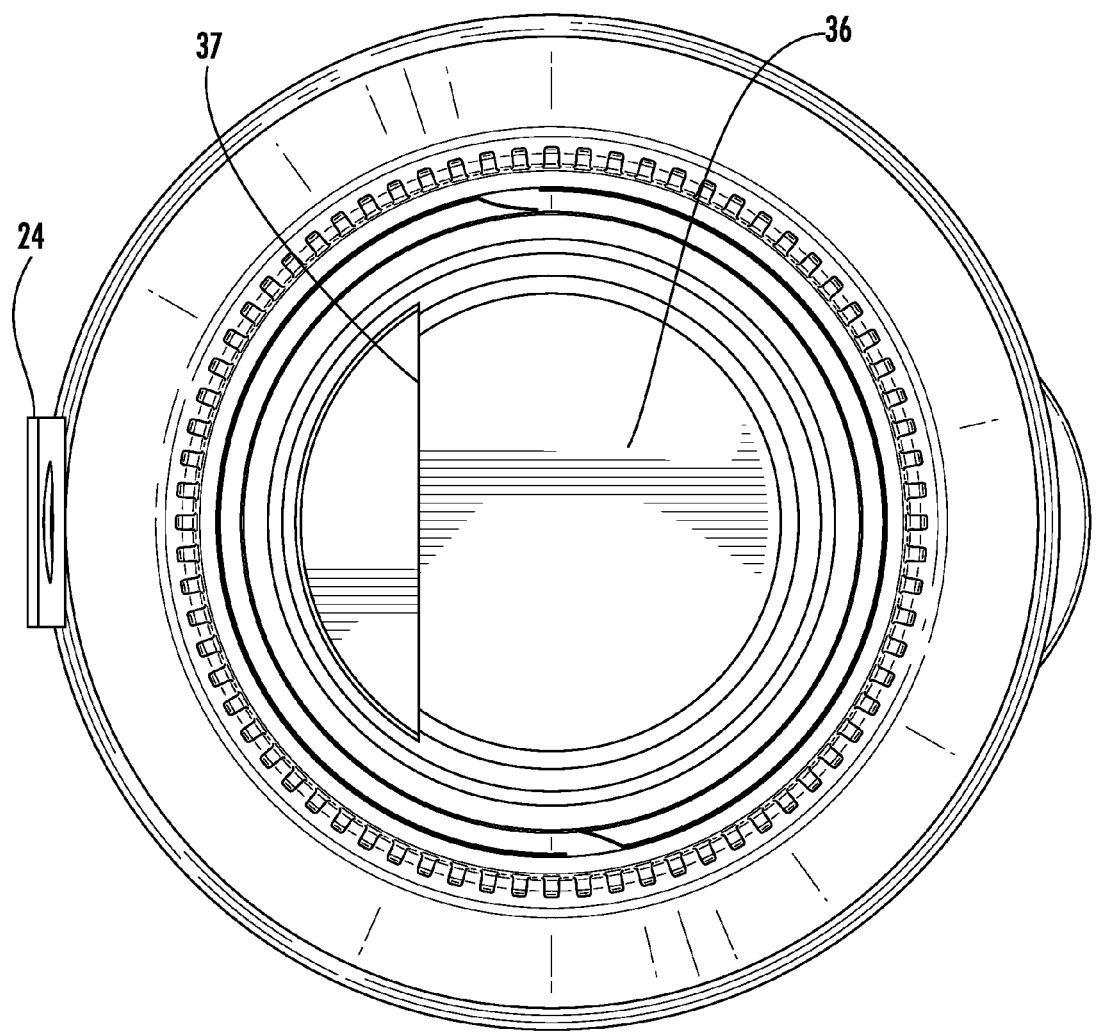
FIG. 14 is a bottom view thereof.

FIGS. 8a and 8b provide additional sectional views of the dispensing closure 10. The hinged closure tab 18 is in a closed position, sealing the exit orifice 26, in FIG. 8a. The hinged closure tab 18 is in an open position in FIG. 8b, so that a product may be dispensed through the exit orifice 26.

FIGS. 9-14 provide additional views of the fully assembled dispensing closure 10 of the exemplary embodiment of the present invention.

Some embodiments of the present invention may be formed of a transparent material, to allow a user to view the measured dose within the reservoir before dispensing. This allows the user to ensure that the full dose has been measured.

In some embodiments, the bottom wall does not extend below the lower end of the lower skirt so that the manufacturer can place a seal or other liner on the neck of a container, and the dispensing closure can be secured to the neck without damaging the seal or liner during product distribution and before purchase.

It can therefore be seen that the one-piece self-leveling measured dose dispensing closure of the present invention is easy to use and can cleanly dispenses a product from a container without the need for additional measuring equipment. The dispensing closure can be formed as a single piece. The dispensing closure has a standard skirt finish. When the dispensing closure is formed of a transparent material, the user can see the premeasured dose before dispensing.

For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A single dose dispensing closure for dispensing a flowable product from a product container, said single dose dispensing closure comprising:

a main body portion having a middle deck, a lower skirt portion extending downwardly from the middle deck and an upper skirt portion extending upwardly from the middle deck, said lower skirt portion being configured and arranged to be secure to a product container;

said main body portion having a front and a rear, said middle deck having a port for passage of said flowable product from said container into said main body portion, said port being located adjacent the rear of said main body portion, said main body portion further including an interior wall extending upwardly from said middle deck, said interior wall being integrally connected with an interior surface of the upper skirt portion whereby said middle deck, said interior wall and said upper skirt portion cooperate to define an interior measuring reservoir for measuring a predetermined dose of said flowable product;

a lid portion connected to said upper skirt portion of said main body portion by a living hinge, said lid portion being movable from an open position to a closed position, said main body portion and said lid portion cooperating to define a filling chamber when said lid portion is in said closed position, an exit orifice defined on said lid portion and positioned so that it is adjacent the front of said main body portion when said lid portion is in said closed position; and an exit orifice closure tab;

whereby said flowable product enters said filling chamber through said port when said exit orifice is closed by said closure tab and said product container is inverted, and further whereby said flowable product drains back into said product container through said port when said product container is uprighted, leaving said predetermined dose of flowable product within said reservoir, and still further whereby said predetermined dose of flowable product passes from said reservoir through said exit orifice when said exit orifice is opened and said product container is inverted again.

2. The dispensing closure of claim 1 wherein said lid portion has an upper lid wall, an annular inner sealing wall depending from said upper lid wall, and an outer lid skirt depending from said upper lid wall, said annular inner sealing wall and said outer lid skirt being configured to frictionally seal said lid portion to said main body portion when in said closed position.

3. The dispensing closure of claim 2 wherein the exit orifice closure tab is hinged.

4. The dispensing closure of claim 3 wherein said middle deck includes a bottom wall, said bottom wall being recessed below said middle deck.

5. The dispensing closure of claim 3 wherein said interior wall is angled rearwardly.

6. The dispensing closure of claim 2 wherein said middle deck includes a bottom wall, said bottom wall being recessed below said middle deck.

7. The dispensing closure of claim 2 wherein said interior wall is angled rearwardly.

8. The dispensing closure of claim 1 wherein said middle deck includes a bottom wall, said bottom wall being recessed below said middle deck.

9. The dispensing closure of claim 8 wherein said interior wall is angled rearwardly.

10. The dispensing closure of claim 1 wherein the exit orifice closure tab is hinged.

11. The dispensing closure of claim 1 wherein said interior wall is angled rearwardly.

12. A single dose dispensing closure for dispensing a flowable product from a product container, said single dose dispensing closure comprising:

a main body portion having a middle deck, a lower skirt portion extending downwardly from the middle deck and an upper skirt portion extending upwardly from the middle deck, said lower skirt portion having an inner surface configured and arranged to be secure to a product container;

said main body portion having a front and a rear, said middle deck having a bottom wall and a port for passage of said flowable product from said container into said main body portion, said port being located adjacent the rear of said main body portion, said main body portion further including an angled interior wall extending upwardly and rearwardly from said middle deck, said angled wall having side portions which are integrally connected with an interior surface of the upper skirt portion, said bottom wall of said middle deck, said angled wall and said upper skirt portion cooperating to define an interior measuring reservoir for measuring a predetermined dose of said flowable product;

a lid portion connected to an upper peripheral edge of said upper skirt portion of said main body portion by a living hinge, said lid portion being movable from an open position to a closed position, said main body portion and said lid portion cooperating to define a filling chamber when said lid portion is in said closed position, said lid portion having an upper lid wall, an annular inner sealing wall depending from said upper lid wall, and an outer lid skirt depending from said upper lid wall, said annular inner sealing wall and said outer lid skirt being configured to frictionally seal said lid portion to said main body portion when in said closed position;

an exit orifice defined on said lid portion and positioned so that it is at the front of said main body portion when said lid portion is in said closed position;

a hinged closure tab attached to said upper lid wall for opening and closing said exit orifice;

whereby said flowable product enters said filling chamber through said port and substantially fills said filling chamber when said exit orifice is closed by said closure tab and said product container is inverted, and further whereby said flowable product partially drains back into said product container through said port when said product container is uprighted, leaving said predetermined dose of flowable product within said reservoir, and still further whereby said predetermined dose of flowable product passes from said reservoir through said exit orifice when said exit orifice is opened and said product container is inverted again.

\* \* \* \* \*